United States Patent [19]
Uhlmann et al.

[11] Patent Number: 5,963,888
[45] Date of Patent: Oct. 5, 1999

[54] FAST METHOD AND APPARATUS FOR NONLINEARLY TRANSFORMING MEAN AND COVARIANCE ESTIMATES

[76] Inventors: Jeffrey K. Uhlmann, 6605 Forbush Ct.; Simon J. Julier, 6602 Forbush Ct., both of Alexandria, Va. 22310

[21] Appl. No.: 08/955,755

[22] Filed: Oct. 22, 1997

[51] Int. Cl.$^6$ ........................................................ G06F 17/60
[52] U.S. Cl. ......................... 702/109; 702/194; 702/199
[58] Field of Search ..................................... 702/108, 109, 702/146, 179, 194, 199; 364/715.11

[56] References Cited

U.S. PATENT DOCUMENTS

| | | | |
|---|---|---|---|
| 5,434,869 | 7/1995 | Maekawa et al. | 395/738 |
| 5,627,768 | 5/1997 | Uhlmann et al. | 364/553 |
| 5,745,383 | 4/1998 | Barber | 702/109 |

Primary Examiner—Kamini Shah

[57] ABSTRACT

A system and a method for estimating the mean and covariance resulting from the application of a given nonlinear function or transformation when applied to a given mean and covariance derived from measurements of a physical system or process. The method comprises selecting a set of points having an arbitrary mean different from the given mean, but with covariance about the given mean equal to that of the given covariance; applying the given nonlinear function to each element of the selected set of points; computing an estimate of the mean of the nonlinearly transformed given mean and covariance; and computing the covariance of the nonlinearly transformed set of points about the estimated mean. The system and method provide an efficient procedure for accurately incorporating nonlinear models of quantities of interest in tracking systems, control mechanisms, and many other related signal processing systems.

20 Claims, 4 Drawing Sheets

38 — Obtain a mean and covariance estimate $\{a,A\}$ of variables relating to a physical system or process 39 — Generate a first set of $m$ vectors, $\{x_1, x_2, \ldots, x_m\}$, and a set of weights $\{w_1, w_2, \ldots, w_m\}$, the sum of the weights being W, so that the sum of $1/W*w_i*(x_i - a)*(x_i - a)^T$, for index $i$ ranging from 1 to $m$, is equal to $A$ 40 — Determine a second set of vectors by applying a nonlinear function $f()$ to each element of the first set of vectors to obtain a second set of vectors, $\{f(x_1), f(x_2), \ldots, f(x_m)\}$

41 — Compute a transformed mean $a^+$ that is equal to the sum of $1/W* w_i*f(x_i)$, for index $i$ ranging from 1 to $m$, plus a nonzero vector $u$ 42 — Compute a transformed covariance as the sum of $1/W*w_i*(f(x_i) - a^+)*(f(x_i) - a^+)^T$, for index $i$ ranging from 1 to $m$

43 — Make transformed covariance positive definite (or semidefinite)

44 — Transmit signal relating to the transformed mean and covariance capable of eliciting a physical response from a response system

FAST METHOD AND APPARATUS FOR NONLINEARLY TRANSFORMING MEAN AND COVARIANCE ESTIMATES

BACKGROUND OF THE INVENTION

1. Field of the Invention

This invention relates generally to a method and apparatus for (1) receiving a measured signal produced directly or indirectly from a signal that is received from a measuring device (2) to efficiently determining a mean and a covariance of a nonlinear transformation of the measured signal and (3) transmitting a resulting signal representing the determined mean and covariance in order to evoke a response related to the measured signal. The response is a physical response from a system receiving the resulting signal. This invention also relates generally to the corresponding signal processing method.

This invention also relates to a signal processing system which is programmed or specialized for estimating the expected value and covariance of a nonlinear function of a measured signal, wherein the nonlinear function is a model of a system which assumes that the measured signal is a measure of at least one of the variables of the modeled system, and for evoking a physical response, and to the corresponding signal processing method.

2. Discussion of Background and Prior Art

The signal processing problem addressed by the current invention is to receive a mean and covariance estimate derived from measurements of a physical system and efficiently apply a nonlinear transformation to that estimate in order to determine the past or future values of variables relating to the physical system, or to nonlinearly transform quantities relating to the physical system to a different coordinate system.

A typical example of where such a signal processing problem arises is a tracking system that maintains an estimate of the position, speed, and bearing of a ballistic missile derived from periodic radar measurements of the position of the missile. Known physical laws governing ballistic motion yield a nonlinear transformation which can be applied to a state vector containing values relating to the position, speed, and bearing of the missile at a given time to estimate any past or future position of the missile between its launch and destination points. The ability to determine future positions of missiles is critical for missile defense systems which must deploy a weapon to impact a missile at a future point in its trajectory.

In the case of a missile tracking system it is often also the case that the state vector maintained by the tracking system is represented in a spherical coordinate system determined by the position of the radar. In order to deploy a remotely located weapon that does not have information about this coordinate system, however, it is necessary to nonlinearly transform the predicted position estimate of the missile to a globally known coordinate system. The application of nonlinear transformations to a state vector which has no associated uncertainty is generally straightforward, but if the state vector represents only an expected value which has an associated covariance matrix defining the uncertainty in the state estimate, then the application of a nonlinear transformation becomes extremely difficult.

A signal herein is defined as any measurable quantity that is related to the changing of the physical state of a process, system, or substance. A signal includes, but is not limited to, radiation produced by a natural or man-made process, electrical fluctuations produced by a natural or a man-made process, distinctive materials or chemicals produced by a natural or man-made process, distinctive structures or configurations of materials produced by a natural or a man-made process, or distinctive patterns of radiation or electrical activity produced by a natural or man-made process.

Most generally, a signal representing a measurement of any physical system inherently has some degree of random error associated therewith. Thus, the model of any physical system, if it is to accurately account for that random error, must include a way to estimate the expected values and uncertainties in the values of the physical system that occur due to the random error.

The measurement of a signal is provided by a measuring device. A measuring device as defined herein may be, but is not limited to, any physical device that interacts with a physical system and provides information that can be converted into an estimate comprised of a nominal estimate of the state of the system and an estimate of the error associated with that nominal state estimate. A measuring device as defined herein includes any device that emits a signal and measures the change of the signal upon its return, a device that measures a signal that is naturally produced by a physical process, or any device that measures a signal that is produced by a man-made process.

In one of the most common formulations of the signal processing problem, each estimate is represented as, or can be converted to, a pair comprising a state vector (often referred to as the mean) a and an error matrix A, denoted $\{a,A\}$. The state vector a is a (column) vector composed of m elements in which element $a_i$ corresponds to a variable, such as size or temperature, describing the state of a system of interest. The error matrix A is a matrix having m rows and m columns in which the element $A_{ij}$, for any choice of i and j between 1 and m, is related to the expected value of the product of the errors associated with the values stored in elements $a_i$ and $a_j$. If the value of element $A_{ij}$ is precisely the expected value of the product of the errors associated with the values stored in elements $a_i$ and $a_j$, for any choice of i and j between 1 and m, then A is referred to as the error covariance of the estimated state vector a.

The error matrix A is often referred to as a covariance matrix according to a general definition of a covariance matrix as being a symmetric matrix with nonnegative eigenvalues, but A is not in general the true error covariance T associated with the state estimate a because T is usually unknown. The standard practice is to choose A large enough that it can be assumed to be of the form $A=T+E$, where E is an unknown covariance matrix representing the overestimated components of A. An overestimated covariance matrix is said to be "conservative" because it suggests that the state estimate is less accurate than it actually is. This is preferred to an underestimated covariance that suggests that the state estimate is more accurate than it actually is. For example, an underestimated covariance could lead a chemical plant operator to believe that the state of a chemical reaction is comfortably within safe operating bounds when in fact the magnitude of the errors in the state estimate are sufficiently large that the true state could easily be outside of the bounds.

(The terms mean and covariance sometimes will be used hereafter as abbreviations for state vector and error matrix, respectively, in a manner consistent with colloquial usage in the fields of estimation, filtering, and control.)

A measuring device typically generates a signal that is related according to known equations or physical laws to the state of a physical system that is measured by the device. By using the equations or physical laws, the signal produced by the measuring device may be converted into quantities representing the values of variables of interest, such as temperature or pressure, relating to the state of the system. The variables of interest can then be indexed so that they can be represented in the form of a vector wherein each element of the vector corresponds to a specific variable. The value for each variable derived from the signal produced by the measuring device can then be associated with an element of the vector corresponding to that variable. It is common for the indices of the vector to correspond to addresses of machine readable memory in which the values can be stored for manipulation by a general purpose computer.

By repeatedly measuring the state of a system whose true state is already known, it is possible to determine the actual errors in the measurements by examining the difference between each measurement vector and the vector corresponding to the true state of the system. Using standard methods, the set of measurement errors can be processed to produce a model for generating an estimated error covariance matrix for any subsequent measurement vector produced from the device. In many cases it is also possible to estimate the error covariance matrix associated with a measurement vector using known equations and physical laws that relate the measuring device and the system being measured. These and other methods for generating mean and covariance estimates from signals produced from measuring devices are well known and widely used in traditional signal processing systems.

The prior state-of-the-art methods for applying nonlinear transformations to mean and covariance estimates derived from measurements of physical systems are described in U.S. Pat. No. 5,627,768: "Signal Processing System and Method for Performing a Nonlinear Transformation." U.S. Pat. No. 5,627,768 describes a method and apparatus for applying a nonlinear transformation to a given estimate $\{a,A\}$ by (1) determining a set of vectors having its mean equal to a and its covariance equal to A, (2) applying the desired nonlinear transformation to each element of this set of vectors, and (3) computing the mean and covariance of the resulting transformed set of vectors. The present invention, however, offers various advantages by providing a complementary method for computing the transformed mean according to a scheme other than calculating the mean of the transformed set of vectors. For example, it is often computationally more efficient to compute the transformed mean by simply applying the nonlinear function to a.

The covariance of a set of m column vectors $\{v_1, v_2, \ldots, v_m\}$ about a column vector a is defined to be the sum $1/m*(v_i-a)*(v_i-a)^T$ for all i between 1 and m. The key observation behind the present invention is that the computed covariance about the vector a is identical to what would have been obtained had the set of vectors included the additional elements $\{2*a-v_1, 2*a-v_2, \ldots, 2*a-v_m\}$. This means that if the nonlinear function f( ) is assumed to be symmetric with respect to a, i.e. f(a+u)=f(a-u) for any vector u, then as few as half the number of sample vectors are required for the present invention as would be used in the method of U.S. Pat. No. 5,627,768. Although many nonlinear functions do satisfy these symmetry assumptions, e.g., diffusion-type equations, many others are approximately symmetric so that the computational advantages of assumed symmetry provided by the present invention can actually permit a signal processing system to achieve greater accuracy by accommodating higher update rates, i.e., by allowing more sensor measurements—hence more information— to be processed per unit of time. This improved accuracy is achieved even though deviations from true symmetry may mean that individual sensor measurements are processed less accurately than more sophisticated and computationally intensive methods.

Like U.S. Pat. No. 5,627,768, the present invention also provides a method for independently weighting elements of the chosen set of m vectors to be nearer to or further away from the mean a, while ensuring that the covariance of the set about a is A. This is advantageous when it is desirable to diminish or amplify the effects of a nonlinear transformation on vectors that are relatively far away from the mean. It is most intuitive to interpret a real-valued weight $w_i$ corresponding to a vector $v_i$ as implying that there are $w_i$ copies of $v_i$. Thus the mean of a set of weighted vectors is just the sum of $w_i*v_i$, for all i from 1 to the number of vectors, divided by the number of vectors, i.e., divided by the sum of the weights. The advantages of associating weights with vectors are that it avoids the need to explicitly maintain multiple copies of vectors and it allows the flexibility to include fractional copies of vectors.

Any randomly or deterministically selected set of m weights $\{w_1, w_2, \ldots, w_m\}$ whose sum is W, and set of vectors $\{v_1, v_2, \ldots, v_m\}$ whose mean is nonzero and whose covariance about zero (i.e., the sum of $1/W*w_i*v_i*v_i^T$ for i ranging from 1 to m) is a nonsingular matrix P, can be transformed to ensure that the weighted covariance about the zero vector is A (i.e., the sum of $1/W*w_i*v_i*v_i^T$ is equal to A). This can be accomplished simply by multiplying each vector $v_i$ by the inverse of the matrix square root of P, and then multiplying by the matrix square root of A. This is because the multiplication by the inverse matrix square root of P produces a set of vectors whose covariance about the zero vector is equal to the identity matrix; and the subsequent multiplication by the matrix square root of A then produces a set of vectors whose covariance about the zero vector is equal to A. Adding a to each element of this transformed set of vectors then results in a set of vectors whose covariance about a is equal to A. (There are many other conventional linear algebra methods for constructing a set of vectors having a given mean and covariance, and any one of these methods can be applied in place the method just described.)

Unlike U.S. Pat. No. 5,627,768, the present invention also provides a method for estimating the transformed covariance using any desired estimate of the transformed mean. For example, whereas the method of U.S. Pat. No. 5,627,768 calculates the transformed mean $a^+$ (using different notation than that used in this document) as being the mean of the transformed set of vectors, the present invention permits the transformed mean to be calculated according to any chosen method by defining the transformed covariance to be simply the covariance about $a^+$ of the transformed set of vectors. This method is advantageous when a reliable method is known for estimating the transformed mean and what is needed is just a method for estimating the transformed covariance about that estimated transformed mean.

The key value of the present invention is that it provides a complement to that of U.S. Pat. No. 5,627,768 (i.e., the sets of possible signal processing systems defined by that invention and this invention are completely disjoint), with the present invention providing more computationally efficient means for estimating means and covariances resulting from nonlinear transformations.

SUMMARY OF THE INVENTION

Summary of Objects

It is an object of this invention to provide a method and system for nonlinearly transforming mean and covariance estimates which overcomes the computational drawbacks of the prior state-of-the-art method.

It is another object of this invention to provide a signal processing and response system and method which overcomes the drawbacks of prior methods for nonlinearly transforming mean and covariance estimates involved in tracking of objects and control of physical systems, including the time evolution of a system in which noise is present.

It is another object of this invention to provide a signal processing system and method which enables a computationally relatively simple and efficient method for applying a nonlinear transformation to a mean and covariance estimate.

These and other objects of the invention may be accomplished by a signal processing system using a method of estimating the mean and covariance of a nonlinear function of a mean and covariance estimate of the state of a system, where the signal processing system comprises:

(1) means for measuring a mean and covariance estimate $\{a,A\}$ of variables relating to a physical system or process;

(2) means for generating a first set of m vectors, $\{x_1, x_2, \ldots, x_m\}$, such that a minus $1/m$ times the sum of the elements of the set is nonzero, and a set of weights $\{w_1, w_2, \ldots, w_m\}$, the sum of the weights being W, so that the sum of $1/W^*w_i^*(x_i-a)^*(x_i-a)^T$, for index i ranging from 1 to m, is equal to A;

(3) means for determining a second set of vectors by applying a nonlinear function $f(\ )$ to each element of the first set of vectors to obtain a second set of vectors, $\{f(x_1), f(x_2), \ldots, f(x_m)\}$;

(4) means for computing a transformed mean $a^+$;

(5) means for computing a transformed covariance as the sum of $1/W^*w_i^*(f(x_i)-a^+)^*(f(x_i)-a^+)^T$, for index i ranging from 1 to m, so that the transformed covariance matrix is positive definite (or semidefinite); and (6) means for transmitting a signal relating to the transformed mean and transformed covariance to a response system capable of eliciting a physical response determined in part by the signal.

This method provides benefits over the method of U.S. Pat. No. 5,627,768 in that the mean of the first set of vectors in step (2) is not equal to a, which implies that symmetry assumptions are exploited in step (5) that reduce the total number of vectors to which the nonlinear function must be applied. If the method of U.S. Pat. No. 5,627,768 were to be used, then one or more vectors would have to be added to the first set in order to ensure that the mean of the set is equal to a. As long as the mean of the first set is equal to a, then the one or more elements can be removed from the set and the new set can be transformed to have its covariance about a equal to A. This capability to use a smaller set of vectors provides computational benefits unavailable in the method of U.S. Pat. No. 5,627,768.

These and other objects of the invention also may be accomplished by a signal processing system using a method of estimating the mean and covariance of a nonlinear function of a mean and covariance estimate of the state of a system, where the signal processing system comprises:

(1) means for measuring a mean and covariance estimate $\{a,A\}$ of variables relating to a physical system or process;

(2) means for generating a first set of m vectors, $\{x_1, x_2, \ldots, x_m\}$ and a set of weights $\{w_1, w_2, \ldots, w_m\}$, the sum of the weights being W, so that the sum of $1/W^*w_i^*(x_i-a)^*(x_i-a)^T$, for index i ranging from 1 to m, is equal to A;

(3) means for determining a second set of vectors by applying a nonlinear function $f(\ )$ to each element of the first set of vectors to obtain a second set of vectors, $\{f(x_1), f(x_2), \ldots, f(x_m)\}$;

(4) means for computing a transformed mean $a^+$ that is equal to the sum of $1/W^* w_i^*f(x_i)$, for index i ranging from 1 to m, plus a nonzero vector u.

(5) means for computing a transformed covariance as the sum of $1/W^*w_i^*(f(x_i)-a^+)^*(f(x_i)-a^+)^T$, for index i ranging from 1 to m, so that the transformed covariance matrix is positive definite (or semidefinite); and (6) means for transmitting a signal relating to the transformed mean and transformed covariance to a response system capable of eliciting a physical response determined in part from the signal.

This method provides benefits over the method of U.S. Pat. No. 5,627,768 in that the estimate of the transformed mean $a^+$ in step (4) includes a parameter vector u which may be tuned to optimize performance of the system. For example, if the nonlinear function is known to truly be symmetric with respect to a, then the true transformed mean should be $a^+=f(a)$, which can be achieved in step (4) with u equal to $f(a)$ minus the sum of $1/W^*w_i^*f(x_i)$, for index i ranging from 1 to m. In practice, of course, u does not need to be explicitly evaluated if a direct method for computing $a^+$ is available, e.g., $a^+=f(a)$.

Preferably, instead of repeatedly selecting a first set of vectors and weights, it is advantageous to use a predetermined set of offset vectors $\{e_1, e_2, \ldots, e_m\}$ and $\{w_1, w_2, \ldots, w_m\}$, the sum of the weights being W, so that the sum of $1/W^*w_i^*e_i^*e_i^T$, for index i ranging from 1 to m, is known to equal the identity matrix. From this set of vectors it is possible to generate a set of vectors $\{x_1, x_2, \ldots, x_m\}$ so that the sum of $1/W^*w_i^*(x_i-a)^*(x_i-a)^T$, for index i ranging from 1 to m, is equal to A simply by determining each $x_i$ as a plus the matrix square root of A times $e_i$, for index i ranging from 1 to m. This avoids the repeated computation of the inverse matrix square root of the covariance of a randomly chosen set of vectors that is necessary in transforming the vectors to have covariance A (as described previously).

Preferably, one of the vectors $x_i$ is equal to a. This implies that if a set of offset vectors $\{e_1, e_2, \ldots, e_m\}$ is used, then preferably one of the vectors $e_i$ should be zero.

Preferably, said number of vectors and weights m is less than twice the dimensionality of a.

Preferably, the set of weights $\{w_1, w_2, \ldots, w_m\}$ is selected so that the sum of the weights is one. It is also preferable to choose the weights using known information about the nonlinear function $f(\ )$. If $x_j=a$, then it is preferable to choose $w_j$ relatively smaller than the other weights, it is further preferred that the weights corresponding to vectors not equal to a should all be identical.

Preferably, the transformed covariance is made symmetric and positive definite (or semidefinite) by squaring the estimated transformed covariance (i.e., squaring the sum of $1/W^*w_i^*(f(x_i)-a^+)^*(f(x_i)-a^+)^T$, for index i ranging from 1 to m) and then computing the symmetric square root of the resulting matrix. Squaring and then taking the symmetric square root of a matrix is just one method for ensuring that none of the eigenvalues of the estimated transformed covariance are negative, but directly replacing negative eigenvalues with their absolute values, or some other positive value or zero, is computationally more efficient and may therefore be preferred.

If $w_j$ is negative, then another preferred method for ensuring positive definiteness (or semidefiniteness) is to replace all weights $w_j$ which are negative with zero. (In practice, of course, any mathematical expression multiplied by a wj=0 does not have to be explicitly evaluated when the result is known to be zero.) This approach is computationally much more efficient than computing and replacing eigenvalues, but it may produce a less accurate estimate of the transformed covariance because the information in each vector $x_j$ is discarded.

These and other objects of the invention may also be accomplished by a computer readable memory storing instructions for configuring a signal processing system to perform a method of estimating the mean and covariance of a nonlinear function of a mean and covariance estimate of the state of a system, by configuring the signal processing system to provide:

(1) means for measuring a mean and covariance estimate $\{a,A\}$ of variables relating to a physical system or process;

(2) means for generating a first set of m vectors, $\{x_1, x_2, \ldots, x_m\}$, such that 1/m times the sum of the elements of the set is not equal to a, and a set of weights $\{w_1, w_2, \ldots, w_m\}$, the sum of the weights being W, so that the sum of $1/W^* w_i^*(x_i-a)^*(x_i-a)^T$, for index i ranging from 1 to m, is equal to A;

(3) means for determining a second set of vectors by applying a nonlinear function f( ) to each element of the first set of vectors to obtain a second set of vectors, $\{f(x_1), f(x_2), \ldots, f(x_m)\}$;

(4) means for computing a transformed mean $a^+$;

(5) means for computing a transformed covariance as the sum of $1/W^* w_i^*(f(x_i)-a^+)^*(f(x_i)-a^+)^T$, for index i ranging from 1 to m, so that the transformed covariance matrix is positive definite (or semidefinite); and (6) means for transmitting a signal relating to the transformed mean and transformed covariance to a response system capable of eliciting a physical response determined in part by the signal.

These and other objects of the invention may also be accomplished by a computer readable memory storing instructions for configuring a signal processing system to perform a method of estimating the mean and covariance of a nonlinear function of a mean and covariance estimate of the state of a system, by configuring the signal processing system to provide:

(1) means for measuring a mean and covariance estimate $\{a,A\}$ of variables relating to a physical system or process;

(2) means for generating a first set of m vectors, $\{x_1, x_2, \ldots, x_m\}$ and a set of weights $\{w_1, w_2, \ldots, w_m\}$, the sum of the weights being W, so that the sum of $1/W^* w_i^*(x_i-a)^*(x_i-a)^T$, for index i ranging from 1 to m, is equal to A;

(3) means for determining a second set of vectors by applying a nonlinear function f( ) to each element of the first set of vectors to obtain a second set of vectors, $\{f(x_1), f(x_2), \ldots, f(x_m)\}$;

(4) means for computing a transformed mean $a^+$ that is equal to the sum of $1W^* w_i^* f(x_i)$, for index i ranging from 1 to m, plus a nonzero vector u.

(5) means for computing a transformed covariance as the sum of $1/W^* w_i^* (f(x_i)-a^+)^*(f(x_i)-a^+)^T$, for index i ranging from 1 to m, so that the transformed covariance matrix is positive definite (or semidefinite); and (6) means for transmitting a signal relating to the transformed mean and transformed covariance to a response system capable of eliciting a physical response determined in part by the signal.

Clearly, any computer readable memory which stores instructions for steps 2–5 is sufficient to configure a signal processing system to perform a method of the present invention unless the instructions prohibit the storing of measurement values in computer memory variables corresponding to $\{a,A\}$ or prohibit the storage of the transformed mean and covariance in computer readable memory that could be accessed by a physical response system.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 4a, 4b, and 4c show computer readable memory media capable of storing instructions for configuring a computer, coupled with means for obtaining mean and covariance information derived from measurements made by a physical measuring device, to perform a method of the invention.

DETAILED DESCRIPTION OF THE PREFERRED EMBODIMENTS

Figure 1:
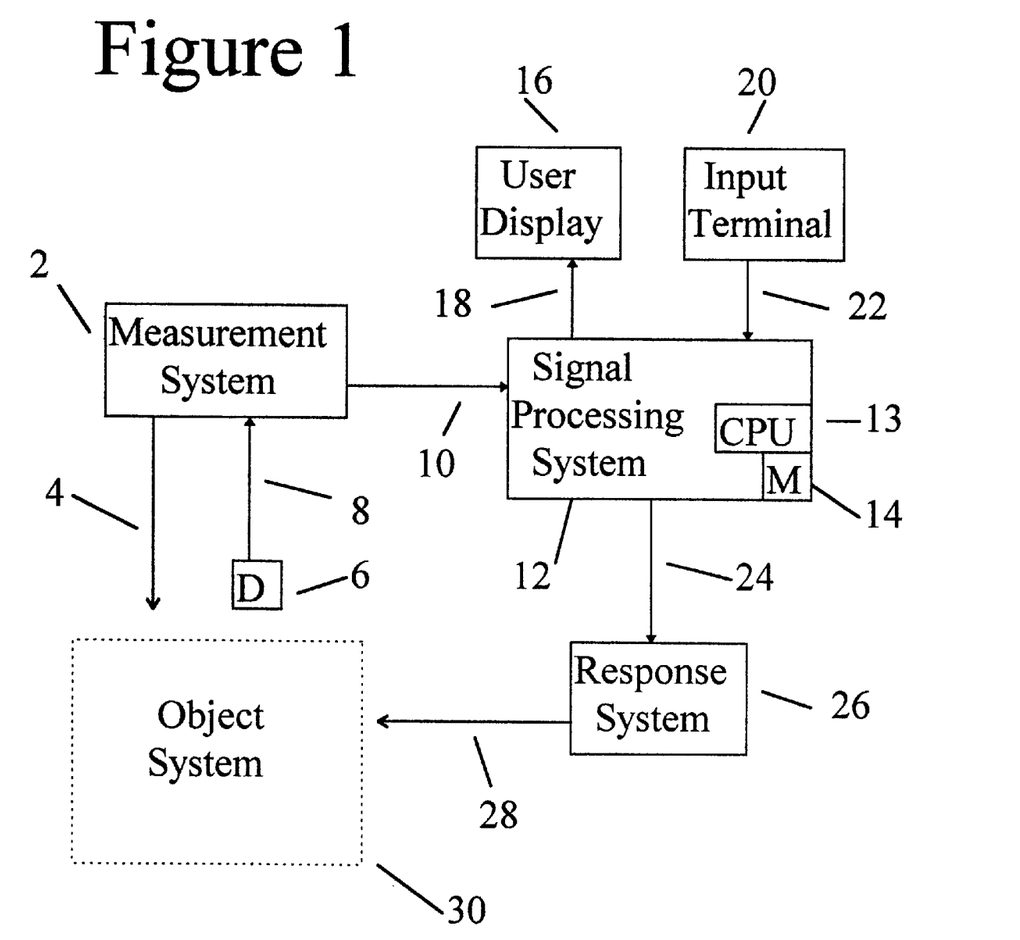
FIG. 1 is a block diagram of a signal processing system programmed or hardwired to perform a signal processing method according to the present invention.

Various other objects, features, and attendant advantages of the present invention will be more fully appreciated as the same becomes better understood from the following detailed description when considered in connection with the accompanying drawings in which like reference characters designate like or corresponding parts, wherein:

FIG. 1 shows a block diagram of an engineering system according to the invention which includes a measurement system 2 for measuring properties of an object system 30. The measurement system 2 includes a probe signal source 4 of probe signals for probing the state of the object system 30. It should be understood that the probe signal source 4 may include multiple remotely located devices, each capable of generating a distinct signal.

A detector 6 detects a signal from the object system 30 that contains information about the state of the object system 30. The detector 6 may include multiple remotely located devices, each of which may be capable of detecting a distinct signal. A connector 8 connects the detector 6 to the measurement system 2 for transmitting a signal corresponding to the signal detected by the detector 6. It should be understood that the connector 8 may include a combination of wires, radio links, and other communications media.

A connector 10 connects the measurement system 2 to a signal processing system 12 for transmitting a signal corresponding to the signal received by the detector 6 to the signal processing system 12. It should be understood that the connector 10, like the connector 8 and all connectors referred to hereafter, may include a combination of wires, radio links, and other communications media.

The signal processing system 12 includes a central processing unit or CPU 13 for performing operations on signals received from the measurement system 2 via the connector 10 in order to process those signals. The CPU 13 may be, but is not restricted to being, a single general purpose computing device such as a microprocessor, a collection of computing devices for parallel processing of information, or an analog computing device. The signal processing system 12 also includes a machine readable memory 14 for storing inter alia the signals received from the measurement system 2, intermediate and final results of processing by the CPU 13, and instructions for controlling the CPU 13. The machine readable memory 14 may consist of a combination of magnetic and optical storage media and may be a combination of read-only and read-writable implementations.

A set of instructions for performing a method for nonlinearly transforming signals, each signal of which can be represented as a mean and covariance, received via the connector 10, or from the machine readable memory 14 containing previously processed signals, may be stored in the machine readable memory 14. (Flow charts for implementing the method for nonlinearly transforming the means and covariances are shown FIG. 2 and FIG. 3.)

A connector 18 connects the signal processing system 12 to a user display 16 for transmitting display data to the user display 16. The user display 16 may be used to display is the signals received by the signal processing system 12 from the measurement system 2 and the results of the processing of those signals by the signal processing system 12.

A connector 22 connects an input terminal 20 to the signal processing system 12 for transmitting input data from the input terminal 20 to the signal processing system 12 for exerting control over the operations performed by the signal processing system 12. The input terminal 20 may be a keyboard, mouse, or other device for transmitting information from a human. The input terminal 20 may be used to control and/or reprogram the signal processing system 12 to perform a desired function.

It should be understood that the user display 16 and connector 18, as well as the input terminal 20 and the connector 22, may not necessarily be present during the processing of signals. If the instructions for controlling the signal processing system 12 are created on a remote system and subsequently transferred to the signal processing system 12 via a connector or portable storage media (thus constituting the connector 22), then the remote system represents the input terminal 20. Similarly, if the results of signal processing are subsequently transferred to a remote display via a connector or portable storage media (thus constituting the connector 18), then the remote display represents the user display 16.

A connector 24 connects the signal processing system 12 to a response system 26 for transmitting signals to the response system 26. The response system 26 responds to the signals received from the signal processing system 12 via connector 24 to perform a function that is affected by the state of the object system. 30, as that state is determined by the signal processing system 12. The physical response of the response system 26 may affect the state of the object system 30.

When the system envisioned in FIG. 1 corresponds to a missile defense system, the measurement system 2 is a collection of remotely located radar systems, each having a device for producing radar signals, corresponding to part of the signal source 4, and an antenna for receiving radar signals corresponding to part of the detector 6. The region within which missiles may be detected corresponds to the object system 30, and a suite of anti-missile weapons corresponds to the response system 26.

In the missile defense system embodiment of the invention, the signal processing system 12 of FIG. 1 receives mean and covariance measurement estimates via connector 10 that relate to the range (i.e., distance from the radar antenna to the missile) and bearing (i.e., angle in which the radar antenna is pointing) of a missile. The signal processing system 12 applies a known nonlinear transformation for converting from range and bearing to cartesian coordinates and transmits a signal relating to the mean and covariance of the cartesian coordinates via the connector 24 to the response system 26. The response system 26 responds to the signal by generating a response, corresponding to response 28, consisting of the deployment of an anti-missile weapon in a direction that is determined as a function of the cartesian coordinates encoded in the signal.

Figure 2:
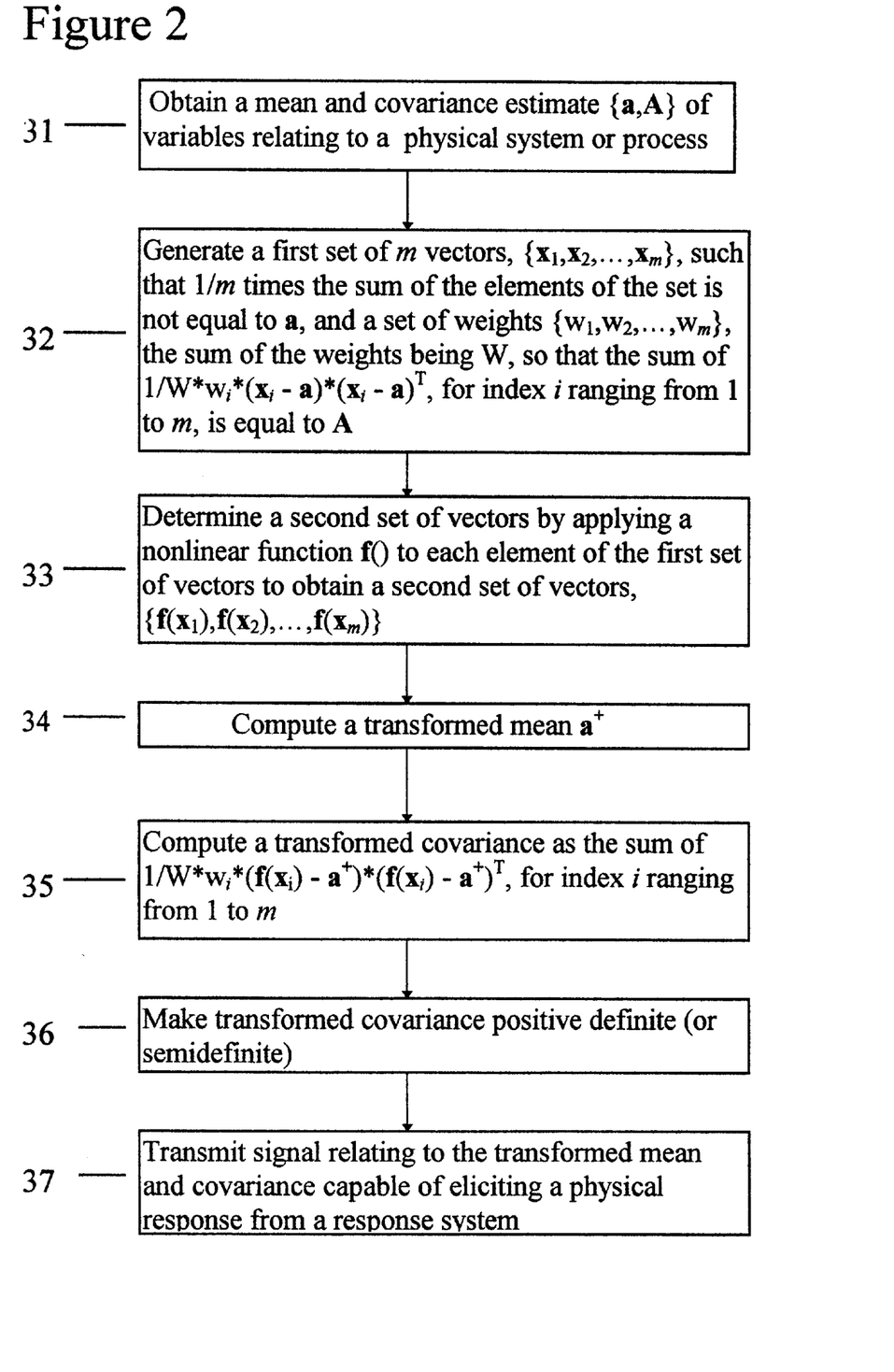
FIG. 2 is a flow chart showing the logical steps that a signal processing system performs when performing a signal processing method according to the present invention.

FIG. 2 is a flow chart showing the logical steps of the method of the present invention. The system of FIG. 1 is a physical apparatus for performing this method. Referring to FIG. 2, step 32 generates a first set of vectors and corresponding weights such that the weighted covariance about a mean obtained in step 31 is equal to a covariance matrix obtained in step 31. The first set of vectors is chosen so that its weighted mean is not equal to the given mean. (If the weighted mean of a set of vectors is equal to the given mean, then the first set of vectors can be selected as a subset of this set of vectors, possibly with different weights, to reduce the number of computations performed in steps 33–35.) Step 33 generates a second set of vectors by applying a given nonlinear transformation to each of the first set of vectors. Step 35 computes a transformed covariance by computing a weighted covariance about an estimated mean computed in step 34. In step 36 the transformed covariance processed to ensure positive definiteness (or semidefiniteness), and a signal relating to the estimated transformed mean and covariance is transmitted to a physical response device.

Figure 3:
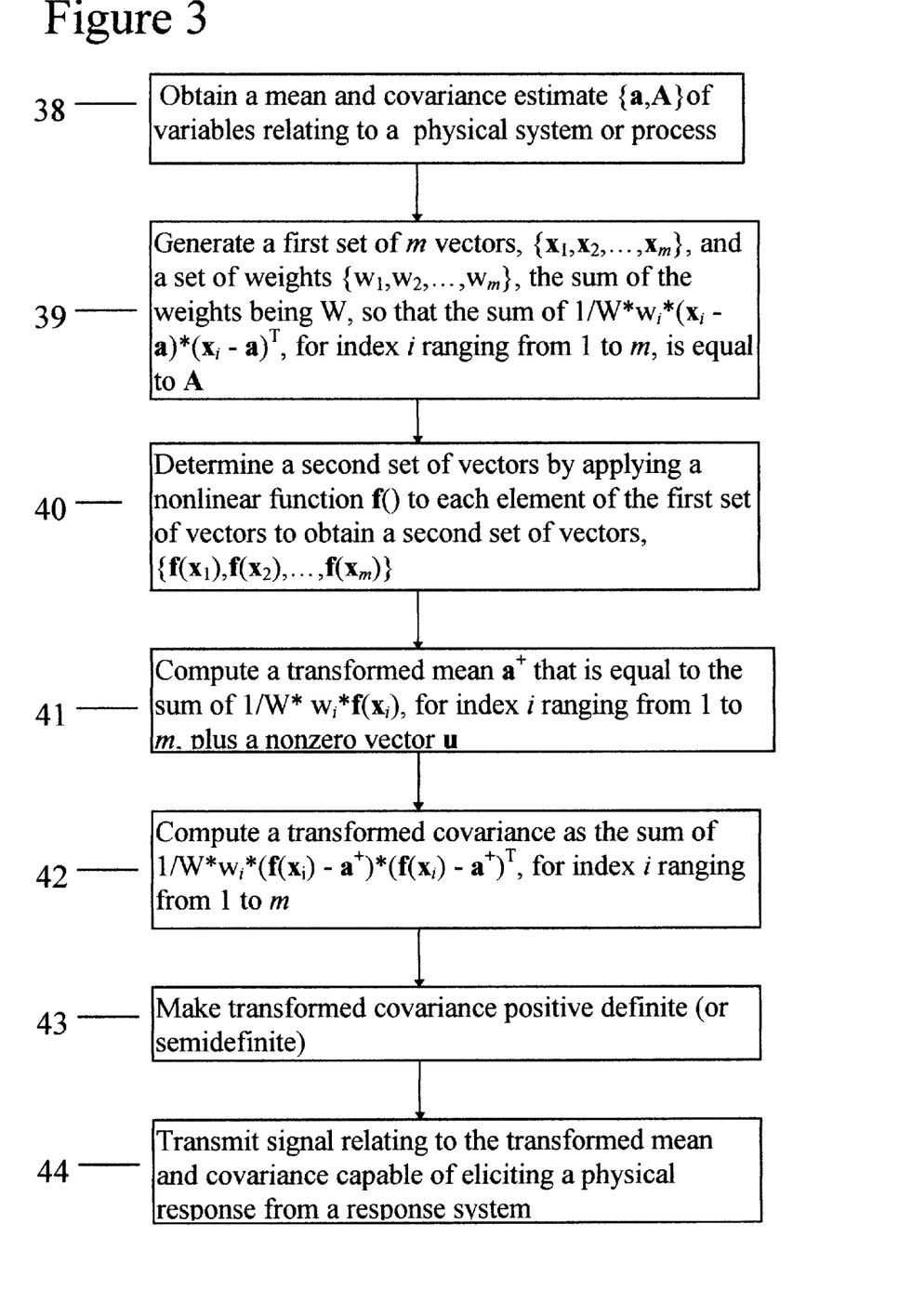
FIG. 3 is a flow chart showing alternative logical steps to those depicted in FIG. 2 that a signal processing performs when performing a method according to the present invention.

FIG. 3 is a flow chart showing alternative logical steps to those depicted in FIG. 2 for a particular implementation of the method of the present invention. The system of FIG. 1 is a physical apparatus for performing this method. Referring to FIG. 3, step 39 generates a first set of vectors and corresponding weights such that the weighted covariance about a mean obtained in step 39 is equal to a covariance matrix obtained in step 38. Step 40 generates a second set of vectors by applying a given nonlinear transformation to each of the first set of vectors. Step 41 generates an estimate of the mean of the nonlinearly transformed given mean and covariance by computing a weighted average of the set of vectors generated by step 40. Step 35 computes a transformed covariance by computing a weighted covariance about an estimated mean computed in step 34. In step 36 the transformed covariance processed to ensure positive definiteness (or semidefiniteness), and a signal relating to the estimated transformed mean and covariance is transmitted to a physical response device.

Figure 4A:
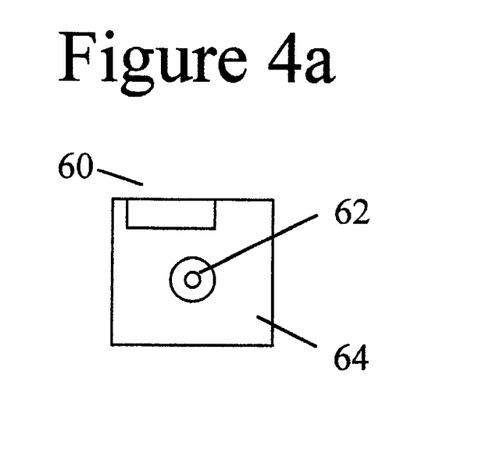
FIG. 4a shows a typical example of a computer readable memory that stores instructions on a magnetic media.

FIG. 4a shows a particular type of magnetic disk computer readable memory for storing instructions for controlling a computer, coupled with means for obtaining mean and covariance information derived from measurements from physical measuring devices, to produce nonlinearly transformed mean and covariance estimates according to a method of the invention. An access slot 60 provides an opening through a disk cover 64 by which a reading device may access the annular disk having a central hole 62 accessible through the disk cover 64.

Figure 4B:
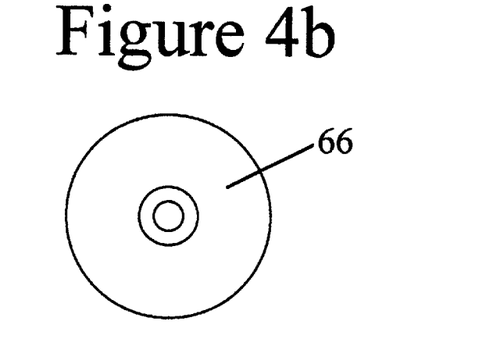
FIG. 4b shows a typical example of a computer readable memory that stores instructions on an optical media.

FIG. 4b shows a particular type of optical computer readable memory for storing instructions for controlling a computer, coupled with means for obtaining mean and covariance information derived from measurements from physical measuring devices, to produce nonlinearly transformed mean and covariance estimates according to a method of the invention. The optically active surface 66 stores the instructions in a form that can be read by a light emitting reading device such as a laser.

Figure 4C:
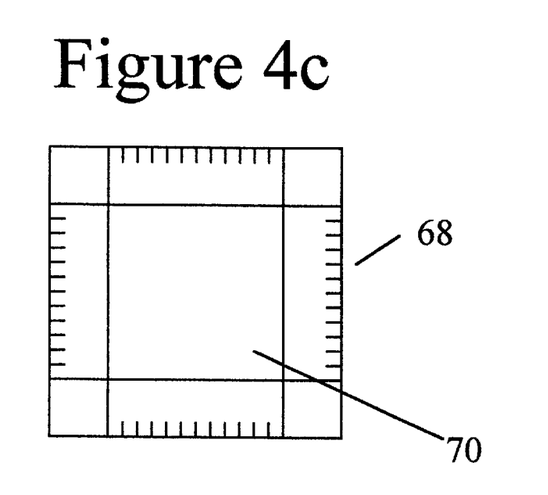
FIG. 4c shows a typical example of a computer readable memory that stores instructions electronically. The computer readable memory media of FIGS. 4a, 4b, and 4c are also capable of storing instructions for controlling a mechanism that is able to physically respond based on a fused estimate.

FIG. 4c shows a particular type of electronic computer readable memory for storing instructions for controlling a computer, coupled with means for obtaining mean and covariance information derived from measurements from physical measuring devices, to produce nonlinearly transformed mean and covariance estimates according to a method of the invention. The connecting pins 68 provide access to instructions stored in electronic form in a memory board 70. Bibioraphy and References: Obviously one skilled in the art of nonlinear control and estimation will see obvious enhancements that can be made in the implementation and use of the present invention according to known practices and techniques. Additional information and literature references on practices and applications relevant to the present invention can be found in the materials filed with U.S. Pat. No. 5,627,768.

What is claimed as new and desired to be secured by Letters Patent of the United States is:

1. A signal processing system for generating a mean vector and covariance matrix pair which estimates the result of applying a given nonlinear function f( ) to a given mean vector a and covariance matrix A, where said mean and covariance {a,A} are derived in part from measurements of a physical system or process, where said signal processing system comprises:
   (1) means for measuring a mean and covariance estimate {a,A} of variables relating to a physical system or process;
   (2) means for generating a first set of m vectors, $\{x_1, x_2, \ldots, x_m\}$, such that a minus 1/m times the sum of the elements of the set is nonzero, and a set of weights $(w_1, w_2, \ldots, w_m)$, the sum of the weights being W, so that a sum of $1/W * w_i * (x_i - a) * (x_i - a)^T$, for index i ranging from 1 to m, is equal to A;
   (3) means for determining a second set of vectors by applying a nonlinear function f( ) to each element of the first set of vectors to obtain a second set of vectors, $\{f(x_1), f(x_2), \ldots, f(x_m)\}$;
   (4) means for computing a transformed mean $a^+$;
   (5) means for computing a transformed covariance as a sum of $1/W * w_i * (f(x_i) - a^+) * (f(x_i) - a^+)^T$, for index i ranging from 1 to m; and
   (6) means for physically responding to a signal relating to the transformed mean and covariance.

2. A system according to claim 1, wherein the said transformed mean $a^+$ is computed to be equal to f(a).

3. A system according to claim 1, wherein said means for computing the transformed covariance matrix includes additional steps to ensure that the transformed covariance matrix is positive definite or semidefinite.

4. A system according to claim 1, wherein a sum of $1/W * w_i * x_i$, for index i ranging from 1 to said m, is equal to a, and said means for computing said transformed mean generates a vector $a^+$ equal to the sum of $1/W * w_i * f(x_i)$, for index i ranging from 1 to m, plus a nonzero vector u.

5. A system according to claim 4, wherein said transformed mean vector $a^+$ is computed directly without an explicit calculation of the nonzero vector u.

6. A system according to claim 1, wherein said m is less than twice the dimensionality of said given mean vector a.

7. A system according to claim 2, wherein said m is less than twice the dimensionality of said given mean vector a.

8. A system according to claim 3, wherein said m is less than twice the dimensionality of said given mean vector a.

9. A system according to claim 4, wherein said m is less than twice the dimensionality of said given mean vector a.

10. A system according to claim 5, wherein said m is less than twice the dimensionality of said given mean vector a.

11. A computer readable memory storing instructions for configuring a signal processing system to perform a method according to the invention for generating a mean vector and covariance matrix pair which estimates the result of applying a given nonlinear function f( ) to a given mean vector a and covariance matrix A, where said mean and covariance {a,A} are derived in part from measurements of a physical system or process, where said signal processing system comprises:
   (1) means for measuring a mean and covariance estimate {a,A} of variables relating to a physical system or process;
   (2) means for generating a first set of m vectors, $\{x_1, x_2, \ldots, x_m\}$, such that a minus 1/m times the sum of the elements of the set is nonzero, and a set of weights $\{w_1, w_2, \ldots, W_m\}$, the sum of the weights being W, so that a sum of $1/W * w_i * (x_i - a) * (x_i - a)^T$, for index i ranging from 1 to m, is equal to A;
   (3) means for determining a second set of vectors by applying a nonlinear function f( ) to each element of the first set of vectors to obtain a second set of vectors, $\{f(x_1), f(x_2), \ldots, f(x_m)\}$;
   (4) means for computing a transformed mean $a^+$;
   (5) means for computing a transformed covariance as a sum of $1/W * w_i * (f(x_i) - a_+) * (f(x_i) - a^+)^T$, for index i ranging from 1 to m; and
   (6) means for physically responding to a signal relating to the transformed mean and covariance.

12. A computer readable memory according to claim 11, wherein the said transformed mean $a^+$ is computed to be equal to f(a) according to instructions stored in said computer readable memory.

13. A computer readable according to claim 11, wherein said means for computing the transformed covariance matrix includes additional steps to ensure that the transformed covariance matrix is positive definite or semidefinite.

14. A computer readable memory according to claim 11, wherein a sum of $1/W * w_i * x_i$, for index i ranging from 1 to said m, is equal to a, and said means for computing said transformed mean generates a vector $a^+$ equal to the sum of $1/W * w_i * f(x_i)$, for index i ranging from 1 to m, plus a nonzero vector u according to instructions stored in said computer readable memory.

15. A computer readable memory according to claim 14, wherein said transformed mean vector $a^+$ is computed directly without an explicit calculation of the nonzero vector u according to instructions stored in said computer readable memory.

16. A computer readable memory according to claim 11, wherein said m is less than twice the dimensionality of said given mean vector a.

17. A computer readable memory according to claim 12, wherein said m is less than twice the dimensionality of said given mean vector a according to instructions stored in said computer readable memory.

18. A computer readable according to claim 13, wherein said m is less than twice the dimensionality of said given mean vector a.

19. A computer readable memory according to claim 14, wherein said m is less than twice the dimensionality of said given mean vector a.

20. A computer readable memory according to claim 15, wherein said m is less than twice the dimensionality of said given mean vector a.

* * * * *